United States Patent
Chen et al.

(10) Patent No.: US 9,736,802 B2
(45) Date of Patent: Aug. 15, 2017

(54) METHOD FOR MANAGING INFORMATION OF TIMING DIFFERENCE BETWEEN MICRO CELL AND MACRO CELL

(71) Applicant: Huawei Technologies Co., Ltd., Shenzhen (CN)

(72) Inventors: Dong Chen, Shanghai (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 476 days.

(21) Appl. No.: 14/305,570

(22) Filed: Jun. 16, 2014

(65) Prior Publication Data

US 2014/0302862 A1    Oct. 9, 2014

Related U.S. Application Data

(63) Continuation of application No. PCT/CN2013/070502, filed on Jan. 16, 2013.

(30) Foreign Application Priority Data

Jan. 21, 2012    (CN) .......................... 2012 1 0019829

(51) Int. Cl.
*H04W 72/00* (2009.01)
*H04W 56/00* (2009.01)
*H04W 36/04* (2009.01)

(52) U.S. Cl.
CPC ..... *H04W 56/0015* (2013.01); *H04W 56/001* (2013.01); *H04W 36/04* (2013.01)

(58) Field of Classification Search
CPC . H04W 28/0226; H04W 40/36; H04W 52/40; H04M 15/8038; G06F 1/12;
(Continued)

(56) References Cited

U.S. PATENT DOCUMENTS 8,274,947 B1 * 9/2012 Fang .................... H04W 24/02
370/331
2003/0147362 A1    8/2003 Dick et al.
(Continued)

FOREIGN PATENT DOCUMENTS

CN            2718922 Y      8/2005
CN          102144423 A      8/2011
(Continued)

*Primary Examiner* — Charles Appiah
*Assistant Examiner* — Xiang Zhang
(74) *Attorney, Agent, or Firm* — Slater Matsil, LLP (57) ABSTRACT

Embodiments of the present invention provide a method, a convergent node, and a micro cell base station for managing information of a timing difference between a micro cell and a neighboring macro cell of the micro cell. A convergent node receives information related to the timing difference. The information is sent by a micro cell base station and includes the timing difference. Alternatively, the information includes a frame timing of the micro cell and a frame timing of the neighboring macro cell. If the timing difference is greater than a preset first threshold value of the timing difference, the convergent node to the micro cell base station sends instruction information for adjusting a frame clock value of the micro cell, or sends the micro cell base station reconfiguration information for reconfiguring at least part of timing difference parameters of the micro cell.

18 Claims, 4 Drawing Sheets

(58) Field of Classification Search
CPC .. G06F 8/458; G06F 11/2082; G06F 11/2076; G06F 11/3632; G06F 13/1689
See application file for complete search history.

(56) References Cited

U.S. PATENT DOCUMENTS

| | | |
|---|---|---|
| 2007/0232305 A1* | 10/2007 | Jung .................. H04W 76/021 455/435.1 |
| 2010/0054237 A1 | 3/2010 | Han et al. |
| 2010/0111070 A1 | 5/2010 | Hsu |
| 2010/0203891 A1 | 8/2010 | Nagaraja et al. |
| 2010/0234028 A1 | 9/2010 | Narasimha et al. |
| 2011/0207450 A1* | 8/2011 | Siomina ................ G01S 5/0221 455/422.1 |
| 2012/0003970 A1 | 1/2012 | Iwamura |
| 2012/0309394 A1* | 12/2012 | Radulescu ........ H04W 36/0055 455/436 |

FOREIGN PATENT DOCUMENTS

| | | | |
|---|---|---|---|
| CN | 102282878 A | 12/2011 | |
| EP | 1675279 A2 | 6/2006 | |
| EP | 2389027 A1 | 11/2011 | |
| WO | 2011063047 A1 | 5/2011 | |

* cited by examiner

A micro cell base station acquires information of a timing difference between the micro cell and a neighboring macro cell of the micro cell, where the information of the timing difference includes the timing difference between the micro cell and the neighboring macro cell of the micro cell, or the information of the timing difference includes a frame timing of the micro cell and a frame timing of the neighboring macro cell of the micro cell. ⟶ S401

If the micro cell base station determines that the timing difference between the micro cell and the neighboring macro cell of the micro cell is greater than a preset first threshold value of the timing difference, the micro cell base station adjusts a frame clock value of the micro cell, so that the timing difference between the micro cell and the neighboring macro cell of the micro cell is less than the preset first threshold value of the timing difference ⟶ S402

METHOD FOR MANAGING INFORMATION OF TIMING DIFFERENCE BETWEEN MICRO CELL AND MACRO CELL

This application is a continuation of International Application No. PCT/CN2013/070502 filed on Jan. 16, 2013, which claims priority to Chinese Patent Application No. 201210019829.7, filed on Jan. 21, 2012, both of which are hereby incorporated by reference in their entireties.

TECHNICAL FIELD

The present invention relates to the field of communications technologies and, in particular embodiments to a method, a convergent node, and a micro cell base station for managing a timing difference between a micro cell and a macro cell.

BACKGROUND

To meet a seamless coverage requirement of a communications network, the prior art proposes a heterogeneous network (Hetnet). The Hetnet is a network formed by cells of various sizes and types, such as a macro cell (Macro cell), a micro cell (Micro cell), and a pico cell (Pico Cell). A base station of a macro cell manages multiple cells. A base station of a micro cell or of a pico cell manages only one cell.

In a WCDMA communications network system, a downlink of a WCDMA system has totally 512 scrambling codes (Primary scrambling code, PSC). Each cell is allocated with a PSC used as one of identification parameters of the cell. However, the number of PSCs used by a micro cell in the WCDMA communications system is limited. In this case, for micro cells having overlapping coverage with a macro cell, multiple micro cells share a PSC. Further, when performing measurement on a neighboring cell, a UE is incapable of reading identification parameters other than PSC information of the neighboring cell. To ensure that a user equipment (UE) successfully hands over from a macro cell to a target micro cell having overlapping coverage with the macro cell, after sending a handover message to a gateway managing the target micro cell, an RNC (radio network controller) managing the macro cell manages the gateway of the target micro cell to select the target micro cell by using information such as uniqueness of a timing difference between a micro cell and the macro cell that have the same PSC when only PSC information of the target micro cell and information of a timing difference between the target micro cell and the macro cell can be acquired, so as to hand over the UE.

However, frame timings of base stations of the target micro cell and the macro cell may drift, so a timing difference between the frame timing of the base station (BS) of the target micro cell and the frame timing of the base station of the macro cell may also change, in which case the timing differences between the macro cell and micro cells having the same PSC may be the same. When a target micro cell is determined by using information such as a PSC of the target micro cell and a timing difference between the target micro cell and a macro cell, because information of the timing difference between the micro cell having the same PSC and the macro cell which a UE is in is not unique, a gateway of a micro cell cannot determine the target micro cell, in which case the UE cannot hand over to the target micro cell.

SUMMARY

Embodiments of the present invention provide a method and an apparatus for managing a timing difference between a micro cell and a macro cell, so that information of timing differences between micro cells that have a same PSC and are adjacent to a same macro cell and the macro cell is unique, thereby ensuring that a UE successfully hands over to a target micro cell.

To achieve the preceding objectives, the embodiments of the present invention adopt the following technical solutions.

A method can be used for managing information of a timing difference between a micro cell and a macro cell. A convergent node receives information of a timing difference between the micro cell and a neighboring macro cell of the micro cell. The information of the timing difference is sent by a micro cell base station and includes the timing difference between the micro cell and the neighboring macro cell of the micro cell, or the information of the timing difference includes a frame timing of the micro cell and a frame timing of the neighboring macro cell of the micro cell. If the timing difference is greater than a preset first threshold value of the timing difference, the convergent node to the micro cell base station sends instruction information for adjusting a frame clock value of the micro cell, or sends the micro cell base station reconfiguration information for reconfiguring at least part of timing difference parameters of the micro cell.

A method can be used for managing information of a timing difference between a micro cell and a macro cell. A micro cell base station acquires information of a timing difference between the micro cell and a neighboring macro cell of the micro cell. The information of the timing difference includes the timing difference between the micro cell and the neighboring macro cell of the micro cell, or the information of the timing difference includes a frame timing of the micro cell and a frame timing of the neighboring macro cell of the micro cell. The micro cell base station sends the information of the timing difference to a convergent node. The micro cell base station receives instruction information for adjusting a frame clock value of the micro cell or reconfiguration information for reconfiguring at least part of timing difference parameters of the micro cell when the timing difference is greater than a preset first threshold value of the timing difference. The instruction information or the reconfiguration information is sent by the a convergent node. The micro cell base station adjusts the frame clock value of the micro cell according to the instruction information or reconfigures at least part of the timing difference parameters of the micro cell according to the reconfiguration information.

A method can be used for managing information of a timing difference between a micro cell and a macro cell. A micro cell base station acquires information of a timing difference between the micro cell and a neighboring macro cell of the micro cell. The information of the timing difference includes the timing difference between the micro cell and the neighboring macro cell of the micro cell, or the information of the timing difference includes a frame timing of the micro cell and a frame timing of the neighboring macro cell of the micro cell. If the timing difference is greater than a preset first threshold value of the timing difference, the micro cell base station sends the information of the timing difference and information that the timing difference between the micro cell and the neighboring macro cell of the micro cell is greater than the preset first threshold of the timing difference to a convergent node. The micro cell base station receives instruction information for adjusting a frame clock value of the micro cell or reconfiguration information for reconfiguring at least part of timing difference parameters of the micro cell. The instruction information or the reconfiguration information is sent by the a convergent node. The micro cell base station adjusts the frame clock value of the micro cell according to the instruction information reconfigures at least part of the timing difference parameters of the micro cell according to the reconfiguration information.

A method can be used for managing information of a timing difference between a micro cell and a macro cell. A micro cell base station acquires information of a timing difference between the micro cell and a neighboring macro cell of the micro cell. The information of the timing difference includes the timing difference between the micro cell and the neighboring macro cell of the micro cell, or the information of the timing difference includes a frame timing of the micro cell and a frame timing of the neighboring macro cell of the micro cell. If the timing difference is greater than a preset first threshold value of the timing difference, the micro cell base station recess a frame clock value of the micro cell to a preset frame clock value. Alternatively, if the timing difference between the micro cell and the neighboring macro cell of the micro cell is greater than the preset first threshold value of the timing difference, the micro cell base station adjusts the frame clock value of the micro cell according to an offset of the frame clock value of the micro cell.

A convergent node for managing information of a timing difference between a micro cell and a macro cell includes a receiving unit, a sending unit, and a control unit. The receiving unit is configured to receive information of a timing difference between the micro cell and a neighboring macro cell of the micro cell. The information of the timing difference is sent by a micro cell base station and includes the timing difference between the micro cell and the neighboring macro cell of the micro cell. Alternatively, the information of the timing difference includes a frame timing of the micro cell and a frame timing of the neighboring macro cell of the micro cell. If the timing difference is greater than a preset first threshold value of the timing difference, the control unit is configured to control the sending unit to send instruction information for adjusting a frame clock value of the micro cell or send reconfiguration information for reconfiguring at least part of timing difference parameters of the micro cell. The sending unit is configured to, according to control by the control unit, send the micro cell base station the instruction information for adjusting the frame clock value of the micro cell or the reconfiguration information for reconfiguring at least part of the timing difference parameters of the micro cell.

A micro cell base station for managing information of a timing difference between a micro cell and a macro cell includes an acquiring unit, a receiving unit, a sending unit, and a control unit. The acquiring unit is configured to acquire information of a timing difference between the micro cell and a neighboring macro cell of the micro cell. The information of the timing difference includes the timing difference between the micro cell and the neighboring macro cell of the micro cell. Alternatively, the information of the timing difference includes a frame timing of the micro cell and a frame timing of the neighboring macro cell of the micro cell. The sending unit is configured to send the information of the timing difference between the micro cell and the neighboring macro cell of the micro cell to a convergent node. The receiving unit is configured to, when the timing difference is greater than a preset first threshold value of the timing difference, receive instruction information for adjusting a frame clock value of the micro cell or reconfiguration information for reconfiguring at least part of timing difference parameters of the micro cell, where the instruction information or the reconfiguration information is sent by the a convergent node. The control unit is configured to adjust the frame clock value of the micro cell according to the instruction information received by the receiving unit, or reconfigure at least part of the timing difference parameters of the micro cell according to the reconfiguration information.

A micro cell base station for managing information of a timing difference between a micro cell and a macro cell includes an acquiring unit and a control unit. The acquiring unit is configured to acquire information of a timing difference between the micro cell and a neighboring macro cell of the micro cell. The information of the timing difference includes the timing difference between the micro cell and the neighboring macro cell of the micro cell. Alternatively, the information of the timing difference includes a frame timing of the micro cell and a frame timing of the neighboring macro cell of the micro cell. If the timing difference is greater than a preset first threshold value of the timing difference, the control unit is configured to adjust a frame clock value of the micro cell.

A system for managing information of a timing difference between a micro cell and a macro cell includes the convergent node and the micro cell base station.

According to a method, a convergent node, a micro cell base station, and a system for managing information of a timing difference between a micro cell and a macro cell provided in the embodiments of the present invention, a convergent node receives information of a timing difference between a micro cell and a neighboring macro cell of the micro cell, where the information of the timing difference is reported by a micro cell base station, and if the timing difference is greater than a preset first threshold value of the timing difference, instruction information for adjusting a frame clock of the micro cell is sent to the micro cell, so that a timing difference between the adjusted micro cell and the neighboring macro cell of the micro cell is less than the preset first threshold value of the timing difference; alternatively, reconfiguration information is sent to the micro cell, so that the timing difference between the micro cell and the neighboring macro cell of the micro cell is less than the threshold value of the timing difference, where the threshold value of the timing difference is reconfigured according to the reconfiguration information, and the information of the timing difference between the micro cell and the neighboring macro cell of the micro cell is unique, thereby ensuring that a UE successfully hands over to a target micro cell.

BRIEF DESCRIPTION OF THE DRAWINGS

To illustrate the technical solutions according to the embodiments of the present invention or in the prior art more clearly, the following briefly introduces accompanying drawings required for describing the embodiments or the prior art. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF ILLUSTRATIVE EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In each embodiment of the specification, timing difference parameters of a micro cell and a neighboring macro cell of the micro cell may include: a frame clock value of the micro cell, a threshold value of a timing difference between the micro cell and the macro cell, a detection cycle, a reporting cycle, a gap offset, a clock drift speed of the macro cell, and a clock drift speed of the micro cell. The parameters have the following relationships:

the threshold value of the timing difference=the reporting cycle*(a maximum timing offset rate of the macro base station+a maximum timing offset rate of a micro cell base station)+the gap offset     Formula (1).

In each embodiment of this specification, a convergent node may pre-configure all or a part of the timing difference parameters. According to the number of micro cells sharing a PSC, the convergent node may further reconfigure all or a part of the timing difference parameters.

Alternatively, the timing difference parameters pre-configured by the convergent node may be timing difference parameters configured directly on the convergent node by a network administrator.

Alternatively, the timing difference parameters pre-configured by the convergent node may be some of the timing difference parameters configured on the convergent node by a network administrator. Then, these parameters are used to calculate other timing difference parameters according to Formula (1). For example, the network administrator configures parameters such as the detection cycle, the reporting cycle, the gap offset, the clock drift speed of the macro cell, and the clock drift speed of the micro cell on a convergent node, so as to acquire the threshold value of the timing difference between the micro cell and the neighboring macro cell of the micro cell.

In each embodiment of the specification, a micro cell base station may pre-configure the timing difference parameters. The micro cell base station may also reconfigure the timing difference parameters according to a reconfiguration message sent by the convergent node. The pre-configured timing difference parameters include: a preset frame clock value of the micro cell, a preset first threshold value of the timing difference between the micro cell and the neighboring macro cell of the micro cell, a preset detection cycle, a preset reporting cycle, a preset gap offset, a preset clock drift speed of the macro cell, and a preset clock drift speed of the micro cell.

Alternatively, the timing difference parameters pre-configured by the micro cell base station may be timing difference parameters configured directly on the micro cell base station by a network administrator.

Alternatively, the timing difference parameters pre-configured by the micro cell base station may be some of the timing difference parameters configured on the micro cell base station by a network administrator. Then, these parameters are used to calculate, according to Formula (1), other timing difference parameters required by the micro cell base station. For example, the network administrator configures parameters such as the detection cycle, the reporting cycle, the gap offset, the clock drift speed of the macro cell, and the clock drift speed of the micro cell in the micro cell, so as to acquire a threshold value of a timing difference between the micro cell base station and a macro cell base station, or configure some other parameters to calculate the reporting cycle.

Alternatively, the timing difference parameters pre-configured by the micro cell base station may be timing difference parameters sent by the convergent node.

Alternatively, the timing difference parameters pre-configured by the micro cell base station may be some of the timing difference parameters configured on the micro cell base station by a network administrator. Then, other timing difference parameters required by the micro cell base station are received from the convergent node. For example, the network administrator configures the frame clock value in the micro cell, and then receives, from the a convergent node, parameters such as the threshold value of the timing difference, the detection cycle, the reporting cycle, the gap offset, the clock drift speed of the macro cell, and the clock drift speed of the micro cell.

Alternatively, the timing difference parameters pre-configured by the micro cell base station may be some of the timing difference parameters configured on the micro cell base station by a network administrator. Then, some other timing difference parameters are received from the convergent node, and then these parameters are used to calculate, according to Formula (1), other timing difference parameters required by the micro cell base station. For example, the network administrator configures the frame clock value in the micro cell, and receives, from the convergent, parameters such as the detection cycle, the reporting cycle, the gap offset, the clock drift speed of the macro cell, and the clock drift speed of the micro cell, and then calculates the threshold value of the timing difference according to Formula (1).

Embodiment 1

Figure 1:
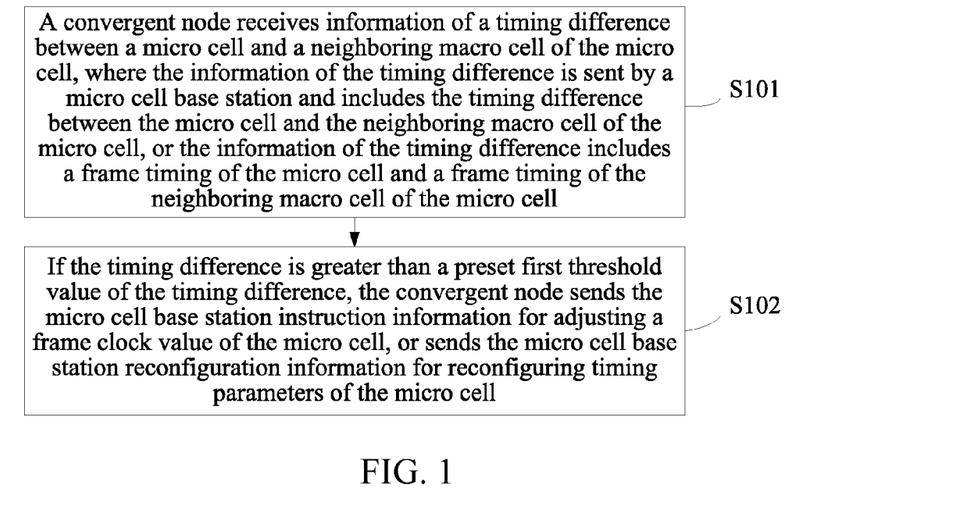
FIG. 1 is a flow chart of a method for managing information of a timing difference between a micro cell and a macro cell according to Embodiment 1 of the present invention.

An embodiment of the present invention provides a method for managing information of a timing difference between a micro cell and a macro cell, and the method is a method on the side of a convergent node. The convergent node involved in this embodiment may be a micro cell gateway, for example, a home NodeB gateway (HNB GW), or may be a radio network controller. As shown in FIG. 1, the method according to this embodiment includes the following steps:

S101. A convergent node receives information of a timing difference between the micro cell and a neighboring macro cell of the micro cell, where the information of the timing difference is sent by a micro cell base station and includes the timing difference between the micro cell and the neighboring macro cell of the micro cell, or the information of the timing difference includes a frame timing of the micro cell and a frame timing of the neighboring macro cell of the micro cell.

The information of the timing difference may further include information of the micro cell, for example, a cell identifier or a scrambling code of the micro cell. The information of the timing difference may further include information of the macro cell, for example, a cell identifier or a scrambling code of the macro cell. In this embodiment, the micro cell base station may send the information of the timing difference to the convergent node through a registration request message, a common measurement report message, an audit response message, or a dedicated reporting message.

S102. If the timing difference is greater than a preset first threshold value of the timing difference, the convergent node sends the micro cell base station instruction information for adjusting a frame clock value of the micro cell, or sends the micro cell base station reconfiguration information for reconfiguring at least part of the timing difference parameters of the micro cell.

Alternatively, the instruction information sent by the convergent node to the micro cell base station is reset instruction information, and the reset instruction information is used to instruct the micro cell base station to reset the frame clock value of the micro cell to a preset frame clock value; alternatively, the instruction information sent by the convergent node to the micro cell base station includes an offset for adjusting the frame clock value of the micro cell, and the instruction information is used to instruct the micro cell base station to adjust the frame clock value of the micro cell according to the offset.

Alternatively, the offset for adjusting the frame clock value of the micro cell includes an offset of a system frame number of the micro cell and/or a chip offset of a system frame.

Alternatively, the reconfiguration information sent by the convergent node to the micro cell base station includes at least part of a reconfigured frame clock value, a reconfigured detection cycle, a reconfigured reporting cycle, a reconfigured threshold of the timing difference, a reconfigured gap offset, a reconfigured clock drift speed of the macro cell, and a reconfigured clock drift speed of the micro cell.

Alternatively, before the convergent node receives the information of the timing difference between the micro cell and the neighboring macro cell of the micro cell, where the information of the timing difference is sent by the micro cell base station, the convergent node sends a request message to the micro cell base station, and the request message is used to instruct the micro cell base station to send the information of the timing difference between the micro cell and the neighboring macro cell of the micro cell to the convergent node.

Alternatively, after the convergent node sends the micro cell base station the instruction information for adjusting the frame clock value of the micro cell or sends the micro cell base station the reconfiguration information for reconfiguring at least timing parameters of the micro cell, the convergent node receives a response message sent by the micro cell base station, and the response message may further carry the information of the timing difference between the micro cell and the neighboring macro cell of the micro cell or information that the frame clock value is adjusted successfully or at least part of the timing parameters are reconfigured successfully after the frame clock value is adjusted or after at least part of the timing parameters are reconfigured.

Alternatively, if the convergent node receives a deregistration request message sent by the micro cell base station, the convergent node deletes the information of the timing difference between the micro cell and the neighboring macro cell of the micro cell, where the information of the timing difference is recorded in the convergent node.

Alternatively, the timing difference parameters include the frame clock value of the micro cell, a threshold value of a timing difference between the micro cell base station and a macro cell base station, the detection cycle, the reporting cycle, the gap offset, the clock drift speed of the macro cell, and the clock drift speed of the micro cell.

According to the method for managing information of a timing difference between a micro cell and a macro cell provided in this embodiment, a convergent node receives information of a timing difference between a micro cell and a neighboring macro cell of the micro cell, where the information of the timing difference is reported by a micro cell base station, and if the timing difference is greater than a preset first threshold value of the timing difference, instruction information for adjusting a frame clock of the micro cell is sent to the micro cell, so that a timing difference between the adjusted micro cell and the neighboring macro cell of the micro cell is less than the preset first threshold value of the timing difference; alternatively, reconfiguration information is sent to the micro cell, so that the timing difference between the micro cell and the neighboring macro cell of the micro cell is less than the threshold value of the timing difference, where the threshold value of the timing difference is reconfigured according to the reconfiguration information, and the information of the timing difference between the micro cell and the neighboring macro cell of the micro cell is unique, thereby ensuring that a UE successfully hands over to a target micro cell.

Embodiment 2

Figure 2:
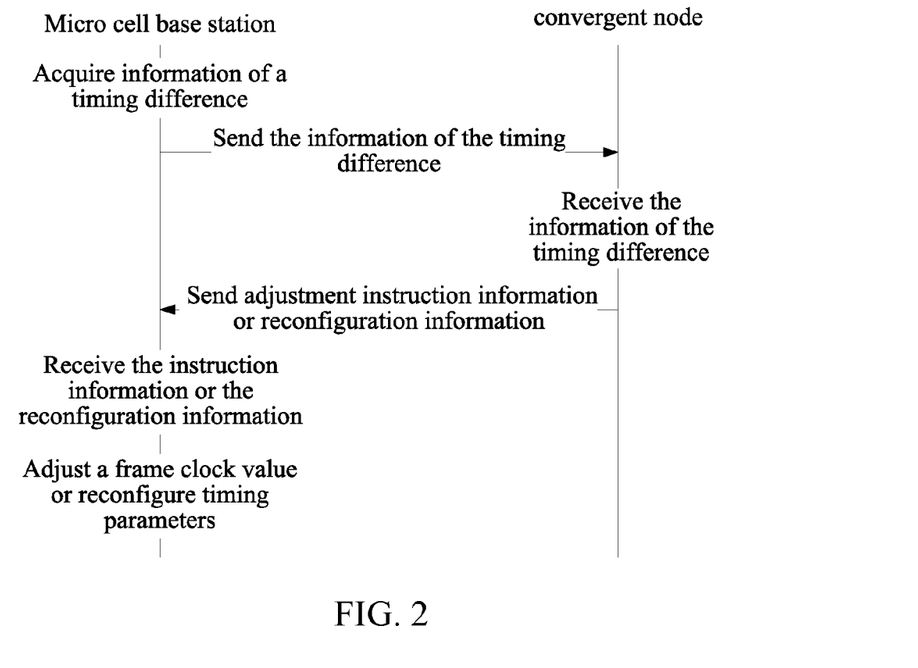
FIG. 2 is a flow chart of a method for managing information of a timing difference between a micro cell and a macro cell according to Embodiment 2 of the present invention.

An embodiment of the present invention provides a method for managing information of a timing difference between a micro cell and a macro cell. A convergent node involved in this embodiment may be a micro cell gateway, for example, a home NodeB gateway, or may be a radio network controller. As shown in FIG. 2, the method according to this embodiment includes the following steps.

S201. A micro cell base station acquires information of a timing difference between the micro cell and a neighboring macro cell of the micro cell, where the information of the timing difference includes the timing difference between the micro cell and the neighboring macro cell of the micro cell, or the information of the timing difference includes a frame timing of the micro cell and a frame timing of the neighboring macro cell of the micro cell.

The information of the timing difference may further include information of the micro cell, for example, a cell identifier or a scrambling code of the micro cell. The information of the timing difference may further include information of the macro cell, for example, a cell identifier or a scrambling code of the macro cell.

Alternatively, the micro cell base station may acquire the information of the timing difference between the micro cell and the neighboring macro cell of the micro cell from a measurement report sent by a UE.

Alternatively, the micro cell base station may also detect the information of the timing difference between the micro cell and the neighboring macro cell of the micro cell according to a preset detection cycle.

S202. The micro cell base station sends the information of the timing difference between the micro cell and the neighboring macro cell of the micro cell to a convergent node.

The micro cell base station may send the information of the timing difference to the convergent node through a registration request message, a common measurement report message, an audit response message, or a dedicated reporting message.

Alternatively, the micro cell base station sends the information of the timing difference between the micro cell and the neighboring macro cell of the micro cell to the convergent node in each preset reporting cycle.

Alternatively, if the micro cell base station determines that the timing difference between the micro cell and the neighboring macro cell of the micro cell is greater than a preset first threshold value of the timing difference, the micro cell base station sends the information of the timing difference between the micro cell and the neighboring macro cell of the micro cell to the convergent node.

Alternatively, the micro cell base station sends the information of the timing difference between the micro cell and the neighboring macro cell of the micro cell when registering with the convergent node.

Alternatively, for the micro cell base station in each preset reporting cycle, if the micro cell base station determines that the timing difference between the micro cell and the neighboring macro cell of the micro cell is greater than the preset first threshold value of the timing difference, the micro cell base station sends the information of the timing difference between the micro cell and the neighboring macro cell of the micro cell to the convergent node.

Alternatively, the convergent node sends a request message to the micro cell base station in each preset reporting cycle to request the micro cell base station to report the information of the timing difference between the micro cell and the neighboring macro cell of the micro cell. Upon receiving the request from the convergent node, the micro cell base station sends the information of the timing difference between the micro cell and the neighboring macro cell of the micro cell to the convergent node. The request message may include information of the macro cell, for example, the scrambling code or the identifier of the macro cell. The request message sent by the convergent node may be a common measurement request message, an audit request message, or a dedicated reporting request message.

S203. The convergent node receives the information of the timing difference between the micro cell and the neighboring macro cell of the micro cell, where the information of the timing difference is sent by the micro cell base station.

S204. If the timing difference is greater than the preset first threshold value of the timing difference, the convergent node sends the micro cell base station instruction information for adjusting a frame clock value of the micro cell, or sends the micro cell base station reconfiguration information for reconfiguring at least part of timing difference parameters of the micro cell.

Alternatively, the instruction information may be reset instruction information used to instruct the micro cell base station to reset the frame clock value of the micro cell to a preset frame clock value.

Alternatively, the instruction information includes an offset for adjusting the frame clock value of the micro cell. For example, the instruction information may include an offset of a system frame number (SFN) of the micro cell and/or a chip (chips) offset of a system frame of the micro cell, and the instruction information may further include an absolute value of the system frame number and/or an absolute value of the chip offset of the system frame. The instruction information may be changed into another form according to an actual need, so that a timing difference between the adjusted micro cell and the neighboring macro cell of the micro cell is less than the preset first threshold value of the timing difference.

Alternatively, the reconfiguration information of the timing difference parameters of the micro cell is determined by the convergent node according to the number of micro cells sharing a PSC. For example, when the number of micro cells sharing a PSC decreases, the threshold value of the timing difference in the reconfiguration information may increase. The reconfiguration information may include at least part of a reconfigured frame clock value, a reconfigured detection cycle, a reconfigured reporting cycle, a reconfigured threshold of the timing difference, a reconfigured gap offset, a reconfigured clock drift speed of the macro cell, and a reconfigured clock drift speed of the micro cell that are among the timing difference parameters, for example, the frame clock value of the micro cell and/or the threshold value of the timing difference.

S205. The micro cell base station receives the instruction information for adjusting the frame clock value of the micro cell or the reconfiguration information for reconfiguring at least part of the timing difference parameters of the micro cell, where the instruction information or the reconfiguration information is sent by the convergent node.

S206. The micro cell base station adjusts the frame clock value of the micro cell according to the received instruction information, or reconfigures at least part of the timing difference parameters of the micro cell according to the received reconfiguration information.

Alternatively, if the instruction information received by the micro cell base station is the reset instruction information, the micro cell base station resets the frame clock value of the micro cell to the preset frame clock value, so that the timing difference between the micro cell and the neighboring macro cell of the micro cell is less than the preset first threshold value of the timing difference.

Alternatively, if the instruction information received by the micro cell base station includes the offset for adjusting the frame clock value of the micro cell, the micro cell base station adjusts the frame clock value of the micro cell according to the offset, so that the timing difference between the micro cell and the neighboring macro cell of the micro cell is less than the preset first threshold value of the timing difference.

Alternatively, if the micro cell base station receives the reconfiguration information, the micro cell base station reconfigures, according to the reconfiguration information, at least part of the timing difference parameters of the micro cell, for example, the frame clock value of the micro cell and/or the first threshold value of the timing difference, or the reporting cycle, so that the timing difference between the micro cell and the neighboring macro cell of the micro cell is less than the reconfigured threshold value of the timing difference.

Alternatively, after the convergent node sends the micro cell base station the instruction information for adjusting the frame clock value of the micro cell or sends the micro cell base station the reconfiguration information for reconfiguring at least timing parameters of the micro cell, the convergent node receives a response message sent by the micro cell base station, and the response message may further carry the information of the timing difference between the micro cell and the neighboring macro cell of the micro cell or information that the frame clock value is adjusted successfully or at least part of the timing parameters are reconfigured successfully after the frame clock value is adjusted or after at least part of the timing parameters are reconfigured.

In this embodiment, after the convergent node receives the information of the timing difference that is sent by the micro cell base station, if the micro cell base station already establishes a connection to another user equipment, to ensure that communication between the micro cell base station and the another user equipment is not interrupted, the convergent node may send the instruction information for adjusting the frame clock value or send the reconfiguration information for reconfiguring at least part of the timing difference parameters to another micro cell base station having a same timing difference range (for example, a micro cell base station with a low load is selected), so that the timing difference between the micro cell and the neighboring macro cell of the micro cell is unique.

According to the method for managing information of a timing difference between a micro cell and a macro cell provided in this embodiment, a convergent node receives information of a timing difference between a micro cell and a neighboring macro cell of the micro cell, where the information of the timing difference is reported by a micro cell base station, and if the timing difference is greater than a preset first threshold value of the timing difference, instruction information for adjusting a frame clock value of the micro cell is sent to the micro cell, so that a timing difference between the adjusted micro cell and the neighboring macro cell of the micro cell is less than the preset first threshold value of the timing difference; alternatively, reconfiguration information is sent to the micro cell, so that the timing difference between the micro cell and the neighboring macro cell of the micro cell is less than the threshold value of the timing difference, where the threshold value of the timing difference is reconfigured according to the reconfiguration information, and the information of the timing difference between the micro cell and the neighboring macro cell of the micro cell is unique, thereby ensuring that a UE successfully hands over to a target micro cell.

Embodiment 3

Figure 3:
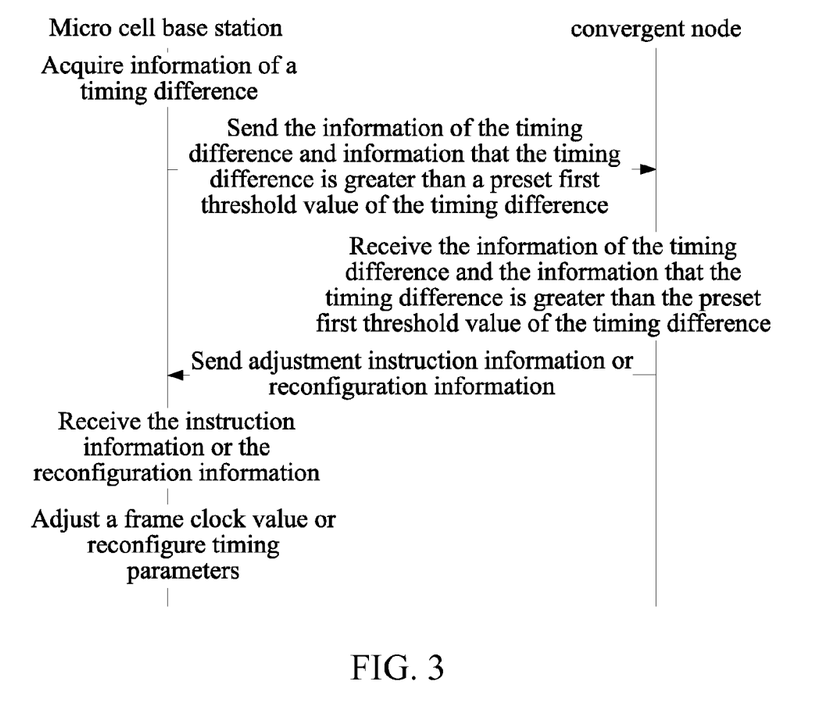
FIG. 3 is a flow chart of a method for managing information of a timing difference between a micro cell and a macro cell according to Embodiment 3 of the present invention.

An embodiment of the present invention provides a method for managing a timing difference between a micro cell and a neighboring macro cell. A convergent node involved in this embodiment may be a micro cell gateway, for example, a home NodeB gateway, or may be a radio network controller. As shown in FIG. 3, the method according to this embodiment includes the following steps.

S301. A micro cell base station acquires information of a timing difference between the micro cell and a neighboring macro cell of the micro cell, where the information of the timing difference includes the timing difference between the micro cell and the neighboring macro cell of the micro cell, or the information of the timing difference includes a frame timing of the micro cell and a frame timing of the neighboring macro cell of the micro cell.

The information of the timing difference may further include information of the micro cell, for example, a cell identifier or a scrambling code of the micro cell. The information of the timing difference may further include information of the macro cell, for example, a cell identifier or a scrambling code of the macro cell.

Alternatively, the micro cell base station may acquire the information of the timing difference between the micro cell and the neighboring macro cell of the micro cell from a measurement report sent by a UE.

Alternatively, the micro cell base station may also detect the information of the timing difference between the micro cell and the neighboring macro cell of the micro cell according to a preset detection cycle.

S302. If the timing difference is greater than a preset first threshold of the timing difference, the micro cell base station sends the information of the timing difference and information that the timing difference is greater than the preset first threshold value of the timing difference to a convergent node.

The micro cell base station may send the information of the timing difference and the information that the timing difference is greater than the preset first threshold value of the timing difference to the convergent node through a registration request message, a common measurement report message, an audit response message, or a dedicated reporting message.

Alternatively, for the micro cell base station in each preset reporting cycle, if the micro cell base station determines that the timing difference between the micro cell and the neighboring macro cell of the micro cell is greater than the preset first threshold value of the timing difference, the micro cell base station sends the information of the timing difference and the information that the timing difference is greater than the preset first threshold value of the timing difference to the convergent node.

Alternatively, after the micro cell base station acquires the information of the timing difference between the micro cell and the neighboring macro cell of the micro cell, if the micro cell base station determines that the timing difference between the micro cell and the neighboring macro cell of the micro cell is greater than the preset first threshold value of the timing difference, the micro cell base station sends the information of the timing difference between the micro cell and the neighboring macro cell of the micro cell to the convergent node.

S303. The convergent node receives the information of the timing difference between the micro cell and the neighboring macro cell of the micro cell and the information that the timing difference is greater than the preset first threshold value of the timing difference, which are sent by the micro cell base station.

S304. The convergent node sends the micro cell base station instruction information for adjusting a frame clock value of the micro cell or reconfiguration information for reconfiguring at least part of timing difference parameters of the micro cell.

Alternatively, the instruction information may be reset instruction information used to instruct the micro cell base station to reset the frame clock value of the micro cell to a preset frame clock value.

Alternatively, the instruction information includes an offset for adjusting the frame clock value of the micro cell. For example, the instruction information may include an offset of a system frame number of the micro cell and/or a chip offset of a system frame of the micro cell, and the instruction information may further include an absolute value of the system frame number and/or an absolute value of the chip offset of the system frame. The instruction information may be changed into another form according to an actual need, so that a timing difference between the adjusted micro cell and the neighboring macro cell of the micro cell is less than the preset first threshold value of the timing difference.

Alternatively, the reconfiguration information of the timing difference parameters of the micro cell is determined by the convergent node according to the number of micro cells sharing a PSC. For example, when the number of micro cells sharing a PSC decreases, the threshold value of the timing difference in the reconfiguration information may increase. The reconfiguration information may include at least part of a reconfigured frame clock value, a reconfigured detection cycle, a reconfigured reporting cycle, a reconfigured threshold of the timing difference, a reconfigured gap offset, a reconfigured clock drift speed of the macro cell, and a reconfigured clock drift speed of the micro cell that are among the timing difference parameters, for example, the frame clock value of the micro cell and/or the threshold value of the timing difference.

S305. The micro cell base station receives the instruction information for adjusting the frame clock value of the micro cell or the reconfiguration information for reconfiguring at least part of the timing difference parameters of the micro cell, where the instruction information or the reconfiguration information is sent by the convergent node.

S306. The micro cell base station adjusts the frame clock value of the micro cell according to the received instruction information, or reconfigures at least part of the timing difference parameters of the micro cell according to the received reconfiguration information.

Alternatively, if the instruction information received by the micro cell base station is the reset instruction information, the micro cell base station resets the frame clock value of the micro cell to the preset frame clock value, so that the timing difference between the micro cell and the neighboring macro cell of the micro cell is less than the preset first threshold value of the timing difference.

Alternatively, if the instruction information received by the micro cell base station includes the offset for adjusting the frame clock value of the micro cell, the micro cell base station adjusts the frame clock value of the micro cell according to the offset, so that the timing difference between the micro cell and the neighboring macro cell of the micro cell is less than the preset first threshold value of the timing difference.

Alternatively, if the micro cell base station receives the reconfiguration information, the micro cell base station reconfigures, according to the reconfiguration information, at least part of the timing difference parameters of the micro cell, for example, the frame clock value of the micro cell and/or the first threshold value of the timing difference, or the reporting cycle, so that the timing difference between the micro cell and the neighboring macro cell of the micro cell is less than the reconfigured threshold value of the timing difference.

Alternatively, after the convergent node sends the micro cell base station the instruction information for adjusting the frame clock value of the micro cell or sends the micro cell base station the reconfiguration information for reconfiguring at least timing parameters of the micro cell, the convergent node receives a response message sent by the micro cell base station, and the response message may further carry the information of the timing difference between the micro cell and the neighboring macro cell of the micro cell or information that the frame clock value is adjusted successfully or at least part of the timing parameters are reconfigured successfully after the frame clock value is adjusted or after at least part of the timing parameters are reconfigured.

In this embodiment, after the convergent node receives the information of the timing difference and the information that the timing difference is greater than the preset first threshold value of the timing difference, which are sent by the micro cell base station, if the micro cell base station already establishes a connection to another user equipment, to ensure that communication between the micro cell base station and the another user equipment is not interrupted, the convergent node may send the instruction information for adjusting the frame clock value or send the reconfiguration information for reconfiguring at least part of the timing difference parameters to another micro cell base station having a same timing difference range, so that the timing difference between the micro cell and the neighboring macro cell of the micro cell is unique.

According to the method for managing information of a timing difference between a micro cell and a macro cell provided in this embodiment of the present invention, after a micro cell base station acquires the information of the timing difference between the micro cell and the neighboring macro cell, the micro cell base station determines whether the timing difference between the micro cell and the neighboring macro cell is greater than a preset first threshold value of the timing difference. If the timing difference is greater than the preset first threshold value of the timing difference, the micro cell base station notifies a convergent node that the timing difference is greater than the preset first threshold value of the timing difference. After receiving the information that the timing difference is greater than the preset first threshold value of the timing difference, the convergent node sends reset instruction information to the micro cell base station, so that the information of the timing difference between the micro cell and the neighboring macro cell of the micro cell is unique, thereby ensuring that a UE successfully hands over to a target micro cell.

Embodiment 4

Figure 4:
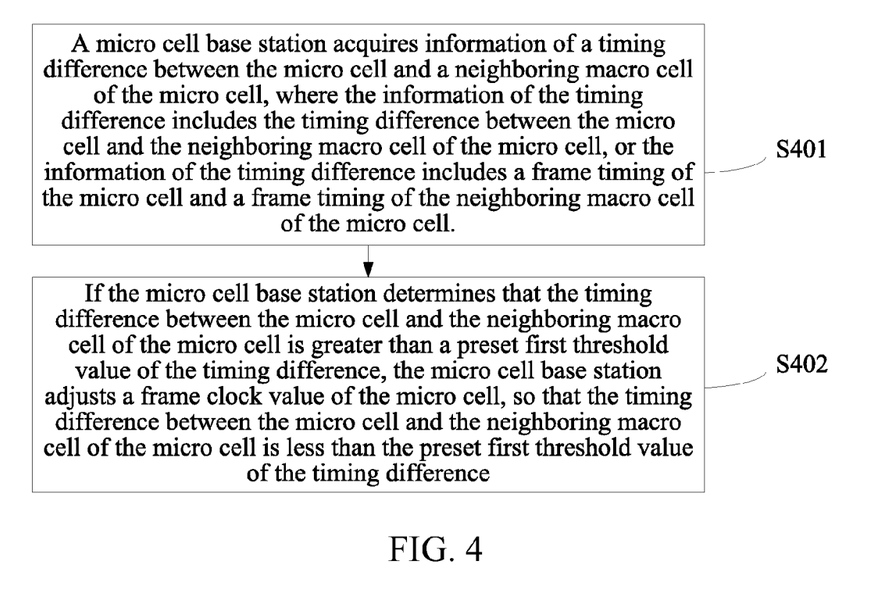
FIG. 4 is a flow chart of a method for managing information of a timing difference between a micro cell and a macro cell according to Embodiment 4 of the present invention.

An embodiment of the present invention provides a method for managing a timing difference between a micro cell and a neighboring macro cell. A convergent node involved in this embodiment may be a micro cell gateway, for example, a home NodeB gateway, or may be a radio network controller. As shown in FIG. 4, the method according to this embodiment includes the following steps:

S401. A micro cell base station acquires information of a timing difference between the micro cell and a neighboring macro cell of the micro cell, where the information of the timing difference includes the timing difference between the micro cell and the neighboring macro cell of the micro cell, or the information of the timing difference includes a frame timing of the micro cell and a frame timing of the neighboring macro cell of the micro cell.

The information of the timing difference may further include information of the micro cell, for example, a cell identifier or a scrambling code of the micro cell. The information of the timing difference may further include information of the macro cell, for example, a cell identifier or a scrambling code of the macro cell.

Alternatively, the micro cell base station may acquire the information of the timing difference between the micro cell and the neighboring macro cell of the micro cell from a measurement report sent by a UE.

Alternatively, the micro cell base station may also detect the information of the timing difference between the micro cell and the neighboring macro cell according to a preset detection cycle.

S402. If the micro cell base station determines that the timing difference between the micro cell and the neighboring macro cell of the micro cell is greater than a preset first threshold value of the timing difference, the micro cell base station adjusts a frame clock value of the micro cell, so that the timing difference between the micro cell and the neighboring macro cell of the micro cell is less than the preset first threshold value of the timing difference.

Alternatively, that the micro cell base station adjusts the frame clock value of the micro cell may specifically be that the micro cell base station adjusts the frame clock value of the micro cell to a preset frame clock value.

Alternatively, that the micro cell base station adjusts the frame clock value of the micro cell may specifically be that an offset of a frame clock of the micro cell is adjusted. For example, an offset of a system frame number of the micro cell and/or a chip offset of a system frame of the micro cell is adjusted.

After the micro cell base station adjusts the frame clock value of the micro cell, alternatively, the micro cell base station may send a response message to a convergent node. The response message may further carry the information of the timing difference between the micro cell and the neighboring macro cell of the micro cell or information that a frame clock value is adjusted successfully after the frame clock value is adjusted.

In this embodiment, after the convergent node receives the information of the timing difference that is sent by the micro cell base station, if the micro cell base station already establishes a connection to another user equipment, to ensure that communication between the micro cell base station and the another user equipment is not interrupted, upon determining that the number of users is lower than a threshold, another micro cell base station having a same timing difference range sends the instruction information for adjusting the frame clock value, so that the timing difference between the micro cell and the neighboring macro cell of the micro cell is unique.

Further, when a communication line is not busy and user call quality is not affected, the micro cell base station may also automatically reset a timing difference parameter of the micro cell to the preset frame clock value within a certain cycle.

According to the method for managing information of a timing difference between a micro cell and a macro cell provided in this embodiment, if the timing difference between the micro cell and a neighboring macro cell of the micro cell is greater than a preset first threshold value of the timing difference, a micro cell base station adjusts a frame clock value of the micro cell, so that the timing difference between the micro cell and the neighboring macro cell of the micro cell is less than the preset first threshold value of the timing difference, and the information of the timing difference between the micro cell and the neighboring macro cell of the micro cell is unique, thereby ensuring that a UE successfully hands over to a target micro cell.

Certainly, the methods for managing the information of the timing difference between the micro cell and the macro cell provided in the embodiments of the present invention are used to ensure uniqueness of the timing difference between the micro cell and the macro cell. To achieve the uniqueness of the timing difference between the micro cell and the macro cell, the following method may also be used: During a handover process of the user equipment, if a convergent node receives the information of the timing difference between the micro cell and the neighboring macro cell of the micro cell from a radio network controller of the macro cell, and the convergent node can uniquely determine, according to the received information of the timing difference, the target micro cell among candidate micro cells having a same scrambling code, after the user equipment successfully hands over from the macro cell to the target micro cell, the convergent node updates information of a timing difference between the target micro cell and the macro cell with the received information of the timing difference.

The convergent node receives the information of the timing difference between the macro and micro cells from a macro network side. If the convergent node cannot uniquely determine the target micro cell according to the received information of the timing difference, the convergent node notifies a candidate target micro cell of detecting the user equipment. If the candidate micro cell detects that uplink signal quality of the user equipment exceeds a predefined threshold, the candidate cell is determined as the target cell, and the rest of the handover process is performed.

After a user hands over successfully or after the candidate micro cell detects that uplink quality of the user exceeds the predefined threshold, the convergent node may update the information of the timing difference between the target micro cell and the macro cell with the received information of the timing difference.

In Embodiments 1, 2, 3, and 4, when the micro cell base station is ineffective or turned off, a deregistration request message is sent to the convergent node. The deregistration request message includes information of the micro cell, for example, an identifier of the micro cell. Upon receiving the deregistration request message, the convergent node deletes the information of the timing difference between the micro cell and the neighboring macro cell of the micro cell, where the information of the timing difference is recorded in the convergent node. After deleting the recorded information of the timing difference, the convergent node sends the micro cell base station a message in response to the deregistration request.

Embodiment 5

Figure 5:
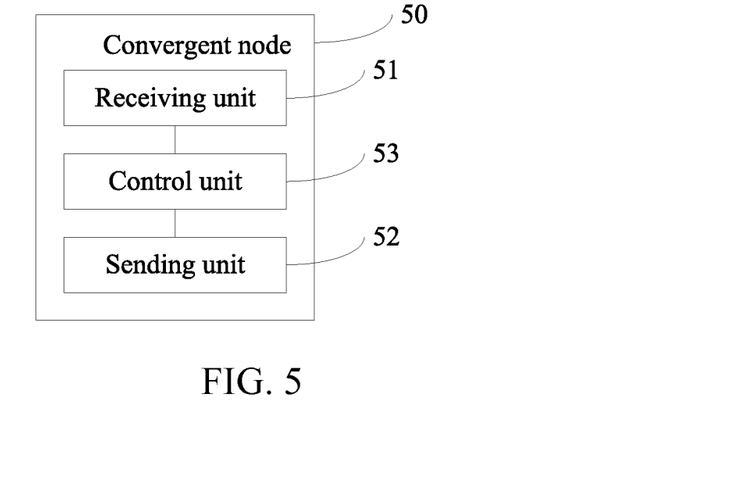
FIG. 5 is a structural block diagram of a convergent node for managing information of a timing difference between a micro cell and a macro cell according to Embodiment 5 of the present invention.

An embodiment of the present invention provides a convergent node 50 for managing information of a timing difference between a micro cell and a macro cell. The convergent node 50 may be a micro cell gateway, for example, a home NodeB gateway, or may be a radio network controller. As shown in FIG. 5, the convergent node 50 includes: a receiving unit 51, a sending unit 52, and a control unit 53.

The receiving unit 51 is configured to receive information of a timing difference between the micro cell and a neighboring macro cell of the micro cell, where the information of the timing difference is sent by a micro cell base station and includes the timing difference between the micro cell and the neighboring macro cell of the micro cell, or the information of the timing difference includes a frame timing of the micro cell and a frame timing of the neighboring macro cell of the micro cell.

The information of the timing difference may further include information of the micro cell, for example, a cell identifier or a scrambling code of the micro cell. The information of the timing difference may further include information of the macro cell, for example, a cell identifier or a scrambling code of the macro cell.

If the timing difference is greater than a preset first threshold value of the timing difference, the control unit 53 is configured to control the sending unit 52 to send instruction information for adjusting a frame clock value of the micro cell or send the micro cell base station reconfiguration information for reconfiguring at least part of timing difference parameters of the micro cell.

The sending unit 52 is configured to, according to control by the control unit 53, send the micro cell base station the instruction information for adjusting the frame clock value of the micro cell or send the micro cell base station the reconfiguration information for reconfiguring at least part of the timing difference parameters of the micro cell.

Alternatively, the timing difference parameters include the frame clock value of the micro cell, a threshold value of the timing difference between the micro cell and the macro cell, a detection cycle, a reporting cycle, a gap offset, a clock drift speed of the macro cell, and a clock drift speed of the micro cell.

Alternatively, the instruction information sent by the sending unit 52 to the micro cell base station is reset instruction information. The reset instruction information is used to instruct the micro cell base station to reset the frame clock value of the micro cell to a preset frame clock value.

Alternatively, the instruction information sent by the sending unit 52 to the micro cell base station includes an offset for adjusting the frame clock value of the micro cell. The instruction information is used to instruct the micro cell base station to adjust the frame clock value of the micro cell according to the offset. The offset for adjusting the frame clock value of the micro cell may include an offset of a system frame number of the micro cell and/or a chip offset of a system frame.

Alternatively, the reconfiguration information includes at least part of a reconfigured frame clock value, a reconfigured detection cycle, a reconfigured reporting cycle, a reconfigured threshold of the timing difference, a reconfigured gap offset, a reconfigured clock drift speed of the macro cell, and a reconfigured clock drift speed of the micro cell, for example, the frame clock value of the micro cell and/or the threshold value of the timing difference.

Alternatively, the control unit 53 is further configured to generate the reconfiguration message according to the number of micro cells sharing a PSC. For example, when the number of micro cells sharing a PSC decreases, the control unit 53 increases the threshold value of the timing difference in the reconfiguration information.

Alternatively, the control unit 53 is further configured to determine whether the received timing difference is greater than the preset first threshold value of the timing difference.

Alternatively, if the micro cell base station determines that the timing difference is greater than the preset first threshold value of the timing difference, the receiving unit 51 is further configured to receive information that the timing difference is greater than the preset first threshold value of the timing difference, where the information is sent by the micro cell base station.

Alternatively, the receiving unit 51 is further configured to receive a deregistration request message sent by the micro cell base station. According to the deregistration request message, the control unit 53 is further configured to delete the information of the timing difference between the micro cell and the neighboring macro cell of the micro cell, where the information of the timing difference is recorded in the convergent node.

Alternatively, the sending unit 52 is further configured to send a request message to the micro cell base station. The request message is used to instruct the micro cell base station to send the information of the timing difference between the micro cell and the neighboring macro cell of the micro cell to the convergent node.

According to the convergent node 50 for managing information of a timing difference between a micro cell and a macro cell provided in this embodiment, the receiving unit 51 receives information of a timing difference between a micro cell and a neighboring macro cell of the micro cell, where the information of the timing difference is reported by a micro cell base station, and if the timing difference is greater than a preset first threshold value of the timing difference, the sending unit 52 sends the micro cell instruction information for adjusting a frame clock of the micro cell, or sends reconfiguration information to the micro cell, so that the information of the timing difference between the micro cell and the neighboring macro cell of the micro cell is unique, thereby ensuring that a UE successfully hands over to a target micro cell.

Embodiment 6

Figure 6:
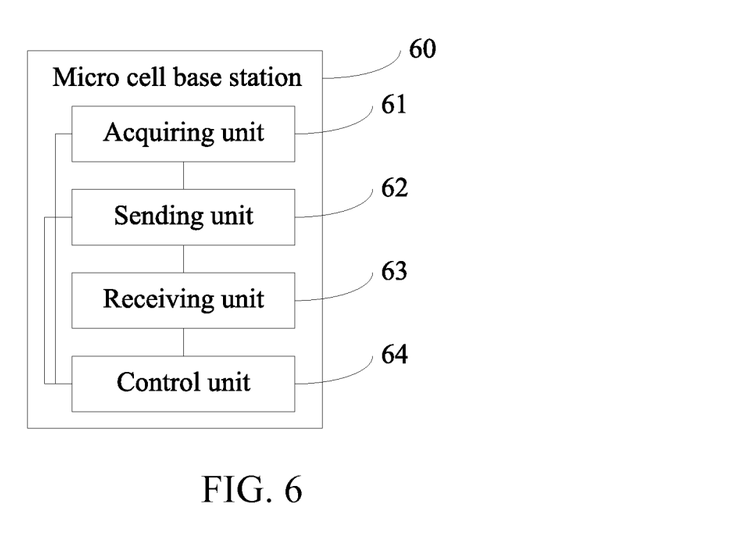
FIG. 6 is a structural block diagram of a micro cell base station for managing information of a timing difference between a micro cell and a macro cell according to Embodiment 6 of the present invention.

An embodiment of the present invention provides a micro cell base station 60 for managing information of a timing difference between a micro cell and a macro cell. As shown in FIG. 6, the micro cell base station 60 includes an acquiring unit 61, a receiving unit 63, a sending unit 62, and a control unit 64.

The acquiring unit 61 is configured to acquire information of a timing difference between the micro cell and a neighboring macro cell of the micro cell. The information of the timing difference includes the timing difference between the micro cell and the neighboring macro cell of the micro cell, or the information of the timing difference includes a frame timing of the micro cell and a frame timing of the neighboring macro cell of the micro cell.

The information of the timing difference may further include information of the micro cell, for example, a cell identifier or a scrambling code of the micro cell. The information of the timing difference may further include information of the macro cell, for example, a cell identifier or a scrambling code of the macro cell.

Alternatively, the acquiring unit 61 may acquire the information of the timing difference between the micro cell and the neighboring macro cell of the micro cell from a measurement report sent by a UE.

Alternatively, the acquiring unit 61 may also detect the information of the timing difference between the micro cell and the neighboring macro cell of the micro cell according to a preset detection cycle.

The sending unit 62 is configured to send the information of the timing difference between the micro cell and the neighboring macro cell of the micro cell to a convergent node.

Alternatively, the sending unit 62 sends the information of the timing difference to the convergent node in each preset reporting cycle.

Alternatively, the sending unit 62 sends the information of the timing difference to the convergent node when the micro cell base station registers with the convergent node.

Alternatively, if the micro cell base station is ineffective or turned off, the sending unit 62 is further configured to send a deregistration request message to the convergent node.

The receiving unit 63 is configured to, when the timing difference is greater than a preset first threshold value of the timing difference, receive instruction information for adjusting a frame clock value of the micro cell or reconfiguration information for reconfiguring at least part of timing difference parameters of the micro cell, where the instruction information or the reconfiguration information is sent by the convergent node.

Alternatively, the timing difference parameters include the frame clock value of the micro cell, a threshold value of the timing difference between the micro cell and the macro cell, a detection cycle, a reporting cycle, a gap offset, a clock drift speed of the macro cell, and a clock drift speed of the micro cell.

Alternatively, the reconfiguration information includes at least one of a reconfigured frame clock value, a reconfigured detection cycle, a reconfigured reporting cycle, a reconfigured threshold of the timing difference, a reconfigured gap offset, a reconfigured clock drift speed of the macro cell, and a reconfigured clock drift speed of the micro cell.

Alternatively, the receiving unit 63 is further configured to receive a reporting request message sent by the convergent node. The sending unit 62 sends the information of the timing difference to the convergent node according to the reporting request message.

The control unit 64 is configured to adjust the frame clock value of the micro cell according to the instruction information received by the receiving unit 63 or reconfigure at least part of the timing difference parameters of the micro cell according to the reconfiguration information, so that the information of the timing difference between the micro cell and the neighboring macro cell of the micro cell is unique.

Alternatively, if the instruction information is reset instruction information, the control unit 64 resets the frame clock value of the micro cell to a preset frame clock value.

Alternatively, if the instruction information includes an offset for adjusting the frame clock value of the micro cell, the control unit 64 adjusts the frame clock value of the micro cell according to the offset. The offset for adjusting the frame clock value of the micro cell may include an offset of a system frame number of the micro cell and/or a chip offset of a system frame.

Alternatively, the control unit 64 reconfigures the frame clock value of the micro cell and/or the threshold value of the timing difference according to the reconfiguration information.

Alternatively, the control unit 64 is further configured to determine whether the timing difference is greater than the preset first threshold value of the timing difference, and if the timing difference is greater than the preset first threshold value of the timing difference, the sending unit 62 sends the information of the timing difference to the convergent node.

Alternatively, the control unit 64 is further configured to determine whether the timing difference is greater than the preset first threshold value of the timing difference, and if the timing difference is greater than the preset first threshold value of the timing difference, the sending unit 62 sends the information of the timing difference to the convergent node, and the sending unit 62 is further configured to send information that the timing difference is greater than the preset first threshold value of the timing difference.

According to the micro cell base station 60 for managing information of a timing difference between a micro cell and a macro cell provided in this embodiment, the acquiring unit 61 acquires information of a timing difference between the micro cell and a neighboring macro cell of the micro cell, the sending unit 62 is configured to send the information of the timing difference to a convergent node, the receiving unit 63 is configured to, when the timing difference is greater than a preset first threshold value of the timing difference, receive instruction information for adjusting a frame clock value of the micro cell or reconfiguration information for reconfiguring at least part of timing difference parameters of the micro cell, where the instruction information or the reconfiguration information is sent by the convergent node, and the control unit 64 is configured to adjust the frame clock value of the micro cell according to the instruction information received by the receiving unit 63 or reconfigure at least part of the timing difference parameters of the micro cell according to the reconfiguration information, so that the information of the timing difference between the micro cell and the neighboring macro cell of the micro cell is unique, thereby ensuring that a UE successfully hands over to a target micro cell.

Embodiment 7

Figure 7:
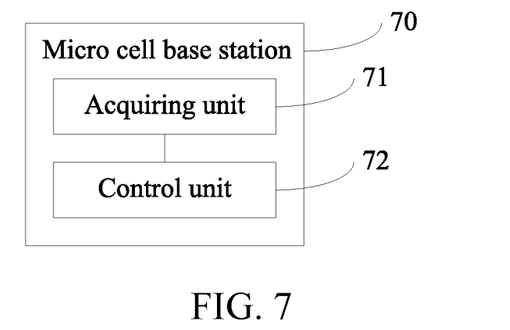
FIG. 7 is a structural block diagram of a micro cell base station for managing information of a timing difference between a micro cell and a macro cell according to Embodiment 7 of the present invention.

An embodiment of the present invention provides a micro cell base station 70 for managing information of a timing difference between a micro cell and a macro cell. As shown in FIG. 7, the micro cell base station 70 includes an acquiring unit 71 and a control unit 72.

The acquiring unit 71 is configured to acquire information of a timing difference between the micro cell and a neighboring macro cell of the micro cell. The information of the timing difference includes the timing difference between the micro cell and the neighboring macro cell of the micro cell, or the information of the timing difference includes a frame timing of the micro cell and a frame timing of the neighboring macro cell of the micro cell.

The information of the timing difference may further include information of the micro cell, for example, a cell identifier or a scrambling code of the micro cell. The information of the timing difference may further include information of the macro cell, for example, a cell identifier or a scrambling code of the macro cell.

Alternatively, the acquiring unit 71 may acquire the information of the timing difference between the micro cell and the neighboring macro cell of the micro cell from a measurement report sent by a user equipment.

Alternatively, the acquiring unit 71 may also detect the information of the timing difference between the micro cell and the neighboring macro cell of the micro cell according to a preset detection cycle.

If the timing difference is greater than a preset first threshold value of the timing difference, the control unit 72 is configured to adjust a frame clock value of the micro cell, so that the timing difference between the micro cell and the neighboring macro cell of the micro cell is less than the preset threshold value of the timing difference, and the information of the timing difference between the micro cell and the neighboring macro cell of the micro cell is unique.

Alternatively, the control unit 72 resets the frame clock value of the micro cell to a preset frame clock value.

Alternatively, the control unit 72 obtains, according to the timing difference and the preset first threshold value of the timing difference, an offset for adjusting the frame clock value of the micro cell, and the control unit 72 adjusts the frame clock value of the micro cell according to the offset, so that the timing difference between the micro cell and the neighboring macro cell of the micro cell is less than the preset first threshold value of the timing difference.

According to the micro cell base station 70 for managing information of a timing difference between a micro cell and a macro cell provided in this embodiment, if a timing difference between the micro cell and a neighboring macro cell of the micro cell is greater than a preset first threshold value of the timing difference, the control unit 72 adjusts a frame clock value of the micro cell, so that the timing difference between the micro cell and the neighboring macro cell of the micro cell is less than the preset first threshold value of the timing difference, and the information of the timing difference between the micro cell and the neighboring macro cell of the micro cell is unique, thereby ensuring that a UE successfully hands over to a target micro cell.

An embodiment of the present invention further provides a system for managing information of a timing difference between a micro cell and a macro cell, which includes the convergent node described in Embodiment 5 and the micro cell base station described in Embodiment 6 or Embodiment 7. The detailed working method of the system is not repeated herein.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk or an optical disk.

The foregoing descriptions are merely specific embodiments of the present invention, but not intended to limit the protection scope of the present invention. Any variation or replacement readily figured out by persons skilled in the art within the technical scope disclosed in the present invention shall fall within the protection scope of the present invention. Therefore, the protection scope of the present invention is subject to the appended claims.

What is claimed is:

1. A method for managing information related to a timing difference between a micro cell and a macro cell, the method comprising:
   receiving, by a convergent node, information related to a timing difference between a micro cell and a neighboring macro cell of the micro cell, wherein the information related to the timing difference is sent by a micro cell base station and comprises the timing difference between the micro cell and the neighboring macro cell of the micro cell, or the information related to the timing difference comprises a frame timing of the micro cell and a frame timing of the neighboring macro cell of the micro cell; and
   sending, by the convergent node to the micro cell base station, instruction information for adjusting a frame clock value of the micro cell, or sending, to the micro cell base station, reconfiguration information for reconfiguring at least part of timing difference parameters of the micro cell, when the timing difference is greater than a preset first threshold value of the timing difference, wherein the timing difference parameters comprise the frame clock value of the micro cell, a threshold value of the timing difference between the micro cell and the macro cell, a detection cycle, a reporting cycle, a gap offset, a clock drift speed of the macro cell, and a clock drift speed of the micro cell.

2. The method according to claim 1, wherein the instruction information sent by the convergent node to the micro cell base station is reset instruction information, and the reset instruction information is used to instruct the micro cell base station to reset the frame clock value of the micro cell to a preset frame clock value; or
   the instruction information sent by the convergent node to the micro cell base station comprises an offset for adjusting the frame clock value of the micro cell, and the instruction information is used to instruct the micro cell base station to adjust the frame clock value of the micro cell according to the offset.

3. The method according to claim 1, wherein the reconfiguration information sent by the convergent node to the micro cell base station comprises at least part of a reconfigured frame clock value, a reconfigured detection cycle, a reconfigured reporting cycle, a reconfigured threshold of the timing difference, a reconfigured gap offset, a reconfigured clock drift speed of the macro cell, and a reconfigured clock drift speed of the micro cell.

4. The method according to claim 1, before receiving the information related to the timing difference, the method further comprises:
   sending, by the convergent node, a request message to the micro cell base station, wherein the request message is used to instruct the micro cell base station to send the information related to the timing difference between the micro cell and the neighboring macro cell of the micro cell to the convergent node.

5. The method according to claim 1, after sending the instruction information for adjusting the frame clock value of the micro cell, or sending the micro cell base station the reconfiguration information for reconfiguring at least part of timing difference parameters of the micro cell, the method further comprises:
   receiving, by the convergent node, a response message after the frame clock value of the micro cell is adjusted or after at least part of the timing difference parameters of the micro cell are reconfigured, wherein the response message comprises the information related to the timing difference between the micro cell and the neighboring macro cell of the micro cell or information that a frame clock of the micro cell is adjusted successfully or at least part of timing parameters are reconfigured successfully.

6. A method for managing information related to a timing difference between a micro cell and a macro cell, the method comprising:
   acquiring, by a micro cell base station, information related to a timing difference between a micro cell and a neighboring macro cell of the micro cell, wherein the information related to the timing difference comprises the timing difference between the micro cell and the neighboring macro cell of the micro cell, or the information related to the timing difference comprises a frame timing of the micro cell and a frame timing of the neighboring macro cell of the micro cell;
   sending, by the micro cell base station, the information related to the timing difference to a convergent node;
   receiving, by the micro cell base station, instruction information for adjusting a frame clock value of the micro cell or reconfiguration information for reconfiguring at least part of timing difference parameters of the micro cell when the timing difference is greater than a preset first threshold value of the timing difference, wherein the instruction information or the reconfiguration information is sent by the convergent node; and adjusting, by the micro cell base station, the frame clock value of the micro cell according to the instruction information, or reconfiguring at least part of the timing difference parameters of the micro cell according to the reconfiguration information, wherein the timing difference parameters comprise the frame clock value of the micro cell, a threshold value of the timing difference between the micro cell and the macro cell, a detection cycle, a reporting cycle, a gap offset, a clock drift speed of the macro cell, and a clock drift speed of the micro cell.

7. The method according to claim 6, wherein acquiring the information related to the timing difference comprises:
   acquiring, by the micro cell base station, the information related to the timing difference between the micro cell and the neighboring macro cell of the micro cell from a measurement report sent by a user equipment; or
   detecting, by the micro cell base station, the information related to the timing difference between the micro cell and the neighboring macro cell of the micro cell according to a preset detection cycle.

8. The method according to claim 6, wherein sending the information related to the timing difference to the convergent node comprises:
   sending, by the micro cell base station, the information related to the timing difference to the convergent node in each preset reporting cycle; or
   sending, by the micro cell base station, the information related to the timing difference to the convergent node when the timing difference comprised in the information related to the timing difference is greater than the preset first threshold value of the timing difference; or
   sending, by the micro cell base station, the information related to the timing difference to the convergent node when the micro cell base station registers with the convergent node; or
   for the micro cell base station in each preset reporting cycle, sending, by the micro cell base station, the information related to the timing difference to the convergent node when the timing difference comprised by the information related to the timing difference is greater than the preset first threshold value of the timing difference; or
   for the micro cell base station, sending, by the micro cell base station, the information related to the timing difference to the convergent node according to a reporting request message sent by the convergent node.

9. The method according to claim 6, wherein adjusting the frame clock value of the micro cell according to the instruction information or reconfiguring at least part of the timing difference parameters of the micro cell according to the reconfiguration information comprises:
   resetting, by the micro cell base station, the frame clock value of the micro cell to a preset frame clock value according to the instruction information; or
   adjusting, by the micro cell base station, the frame clock value of the micro cell according to an offset of the frame clock value of the micro cell, wherein the offset is comprised in the instruction information; or
   reconfiguring, by the micro cell base station, the frame clock value of the micro cell and/or a threshold value of the timing difference according to the reconfiguration information.

10. The method according to claim 6, wherein, after adjusting the frame clock value of the micro cell according to the instruction information or reconfiguring at least part of the timing difference parameters of the micro cell according to the reconfiguration information, the method further comprises:
   sending, by the micro cell base station, a response message to the convergent node, wherein the response message comprises the information related to the timing difference between the micro cell and the neighboring macro cell of the micro cell or information that a frame clock of the micro cell is adjusted successfully or at least part of timing parameters are reconfigured successfully after the micro cell base station adjusts the frame clock value or reconfigures at least part of the timing difference parameters.

11. A convergent node for managing information of a timing difference between a micro cell and a macro cell, the convergent node comprising:
   a memory storage comprising instructions; and
   one or more processors in communication with the memory storage, wherein the one or more processors execute the instructions to:
   receive information related to a timing difference between a micro cell and a neighboring macro cell of the micro cell, the information related to the timing difference being sent by a micro cell base station of the micro cell and comprising the timing difference between the micro cell and the neighboring macro cell of the micro cell, or the information related to the timing difference comprising a frame timing of the micro cell and a frame timing of the neighboring macro cell of the micro cell; and
   control to send instruction information for adjusting a frame clock value of the micro cell or reconfiguration information for reconfiguring at least part of timing difference parameters of the micro cell when the timing difference is greater than a preset first threshold value of the timing difference, wherein the timing difference parameters comprise the frame clock value of the micro cell, a threshold value of the timing difference between the micro cell and the macro cell, a detection cycle, a reporting cycle, a gap offset, a clock drift speed of the macro cell, and a clock drift speed of the micro cell; and
   send the micro cell base station the instruction information for adjusting the frame clock value of the micro cell or the reconfiguration information for reconfiguring at least part of the timing difference parameters of the micro cell.

12. The convergent node according to claim 11, wherein the one or more processors execute the instructions further determine whether the received timing difference is greater than the preset first threshold value of the timing difference; and
   receive information that the timing difference is greater than the preset first threshold value of the timing difference when the timing difference is greater than the preset first threshold value of the timing difference, and the information is sent by the micro cell base station.

13. The convergent node according to claim 11, wherein the one or more processors execute the instructions to further send a request message to the micro cell base station, the request message being used to instruct the micro cell base station to send the information related to the timing difference to the convergent node.

14. A micro cell base station for managing information of a timing difference between a micro cell and a macro cell, comprising:
   a memory storage comprising instructions; and one or more processors in communication with the memory storage, wherein the one or more processors execute the instructions to:

acquire information related to a timing difference between a micro cell and a neighboring macro cell of the micro cell, the information related to the timing difference comprising the timing difference between the micro cell and the neighboring macro cell of the micro cell, or the information related to the timing difference comprising a frame timing of the micro cell and a frame timing of the neighboring macro cell of the micro cell;

send the information related to the timing difference between the micro cell and the neighboring macro cell of the micro cell to a convergent node;

when the timing difference is greater than a preset first threshold value of the timing difference, receive instruction information for adjusting a frame clock value of the micro cell or reconfiguration information for reconfiguring at least part of timing difference parameters of the micro cell, wherein the instruction information or the reconfiguration information is sent by the convergent node, wherein the timing difference parameters comprise the frame clock value of the micro cell, a threshold value of the timing difference between the micro cell and the macro cell, a detection cycle, a reporting cycle, a gap offset, a clock drift speed of the macro cell, and a clock drift speed of the micro cell; and adjust the frame clock value of the micro cell according to the instruction information, or reconfigure at least part of the timing difference parameters of the micro cell according to the reconfiguration information.

15. The micro cell base station according to claim 14, wherein the information related to the timing difference between the micro cell and the neighboring macro cell of the micro cell is acquired from a measurement report sent by a user equipment; or the information related to the timing difference between the micro cell and the neighboring macro cell of the micro cell is detected according to a preset detection cycle.

16. The micro cell base station according to claim 14, wherein the information related to the timing difference is sent to the convergent node in each preset reporting cycle; or wherein the information related to the timing difference is sent to the convergent node when the micro cell base station registers with the convergent node; or wherein, when a reporting request message is sent by the convergent node, the information related to the timing difference is sent to the convergent node according to the reporting request message; or wherein, when determining that the timing difference is greater than the preset first threshold value of the timing difference, the information related to the timing difference is sent to the convergent node.

17. The micro cell base station according to claim 14, wherein the the one or more processors execute the instructions to further determine whether the timing difference is greater than the preset first threshold value of the timing difference, and if the timing difference is greater than the preset first threshold value of the timing difference, send information that the timing difference is greater than the preset first threshold value of the timing difference to the convergent node.

18. The micro cell base station according to claim 14, wherein if the instruction information is reset instruction information, the frame clock value of the micro cell is reset to a preset frame clock value; or wherein, if the instruction information comprises an offset for adjusting the frame clock value of the micro cell, the frame clock value of the micro cell is adjusted according to the offset; or wherein the frame clock value of the micro cell and/or a threshold value of the timing difference is reconfigured according to the reconfiguration information.

* * * * *

UNITED STATES PATENT AND TRADEMARK OFFICE
CERTIFICATE OF CORRECTION

PATENT NO. : 9,736,802 B2  Page 1 of 1
APPLICATION NO. : 14/305570
DATED : August 15, 2017
INVENTOR(S) : Dong Chen It is certified that error appears in the above-identified patent and that said Letters Patent is hereby corrected as shown below:

In the Claims

In Column 24, Line 49, Claim 12, delete "instructions further" and insert --instructions to further--.

In Column 26, Line 18, Claim 17, delete "wherein the the one" and insert --wherein the one--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*